(12) United States Patent
Yi et al.

(10) Patent No.: US 8,442,721 B2
(45) Date of Patent: May 14, 2013

(54) STEERING CONTROLLER FOR MOVABLE ROBOT, STEERING CONTROL METHOD USING THE STEERING CONTROLLER AND MOVABLE ROBOT SYSTEM USING THE STEERING CONTROLLER

(75) Inventors: Byung-Ju Yi, Gyeonggi-do (KR); Young-sik Kwon, Gyeonggi-do (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 249 days.

(21) Appl. No.: 12/722,859

(22) Filed: Mar. 12, 2010

(65) Prior Publication Data

US 2011/0077777 A1   Mar. 31, 2011

(30) Foreign Application Priority Data

Sep. 30, 2009   (KR) .................. 10-2009-0093336

(51) Int. Cl.
*A01B 69/00* (2006.01)
*G06F 19/00* (2011.01)

(52) U.S. Cl.
USPC ........................................... 701/41; 700/245

(58) Field of Classification Search ............ 700/85, 700/245, 262, 263, 264, 259; 701/2, 36, 701/41, 58
See application file for complete search history.

(56) References Cited

PUBLICATIONS

Roh, Se-gon et al., "Differential-Drive In-Pipe Robot for Moving Inside Urban Gas Pipelines", Feb. 2005, IEEE Transactions on Robotics, vol. 21, No. 1.*
Li, Peng et al., "Development of an Adaptive Mobile Robot for In-Pipe Inspection Task", Aug. 5-8, 2007, Proceedings of the 2007 IEEE International Conference on Mechatronics and Automation.*

* cited by examiner

*Primary Examiner* — Muhammad Shafi
(74) *Attorney, Agent, or Firm* — Womble Carlyle Sandridge & Rice, LLP

(57) ABSTRACT

A steering controller for a movable robot is provided. The steering controller drives a plurality of motors, each of which is connected to a wheel. The wheels are spaced apart from each other in the circumferential direction with respect to an axis of a body of the movable robot. The steering controller comprises an input unit, an output unit and a conversion unit. The input unit receives steering signals including velocities of the movable robot according to the moving directions. The output unit outputs driving signals including rotational velocities of the motors. The conversion unit converts the steering signals to the driving signals. The use of the steering controller enables an operator to intuitionally steer the movable robot, making the movable robot convenient to use.

11 Claims, 11 Drawing Sheets

(a)

(b)

(a)

(b)

(a)

(b)

(a)

(b)

(a)

(b)

STEERING CONTROLLER FOR MOVABLE ROBOT, STEERING CONTROL METHOD USING THE STEERING CONTROLLER AND MOVABLE ROBOT SYSTEM USING THE STEERING CONTROLLER

CROSS REFERENCE TO RELATED APPLICATION

This application claims priority under 35 U.S.C. §119 to Korean Patent Application No. 10-2009-0093336, filed Sep. 30, 2009, which is hereby incorporated herein by reference in its entirety.

BACKGROUND OF THE INVENTION

1. Field of the Invention

The present invention relates to a steering controller for a movable robot. More specifically, the present invention relates to a steering controller that allows an operator to intuitionally steer a movable robot, a steering control method using the steering controller, and a movable robot system using the steering controller.

2. Description of the Related Art

Dangerous materials (e.g., gases) flowing through pipes make it difficult to inspect the internal state of the pipes. Further, impurities present within indoor water supply pipes (particularly, old pipes) are difficult to remove owing to the limited diameter of the pipes.

Under these circumstances, there is an urgent need to develop equipment that can remove impurities within pipelines and repair old pipelines while real-time inspecting the internal state of the pipelines irrespective of the material danger and the limitation of small diameter.

There have been many research efforts on developing movable robots that can inspect the internal state of pipelines as specific and limited three-dimensional spaces while moving in the pipelines. Such pipeline inspection movable robots are currently under study.

However, most of the studies on pipeline inspection movable robots have focused on moving the movable robots in close contact with pipelines while maintaining the bodies of the movable robots stable in order to allow the movable robots to move smoothly in the pipelines, achieving improved motion capability of the movable robots.

A pipeline inspection movable robot essentially moves in pipelines equipped with elbows or T-branches. It is not easy to steer the motion of the pipeline inspection movable robot in a desired direction when passing through the nonlinear connection portions.

Particularly, when an operator intends to move a differential-driven pipeline inspection movable robot including three powered wheel chains arranged at angular angles of 120° with respect to each other in a bent pipeline portion, the movable robot is driven in such a manner that the rotational velocity of at least one wheel increases while stopping the other wheel(s) depending on the rotational direction. To this end, the operator recognizes the geometric shape of the pipeline and directly controls the rotational velocities of the wheels in an on-off fashion to steer the movable robot in the bent portion.

This steering method based on on-off control does not cause significant damage to a movable robot moving at a low speed, but it may cause damage to a movable robot (including motors) when the movable robot moves with a large radius of curvature or at a high speed in a pipeline. Further, the on-off steering control method involves directly controlling the rotational velocities of the motors depending on the shape of the bent portion, causing inconvenience and slow speed in steering.

SUMMARY OF THE INVENTION

It is a first object of the present invention to provide a steering controller for a movable robot that allows an operator to intuitionally steer a movable robot.

It is a second object of the present invention to provide a method for controlling the steering of a movable robot by using the steering controller.

It is a third object of the present invention to provide a computer-readable recording medium comprising a program recorded therein to implement the steering control method.

It is a fourth object of the present invention to provide a movable robot system comprising a steering system using the steering controller.

To accomplish the first object of the present invention, there is provided a steering controller for steering a movable robot by driving a plurality of motors, each of which is connected to a wheel, the plurality of wheels being spaced apart from each other in the circumferential direction with respect to an axis of a body of the movable robot, wherein the steering controller comprises an input unit for receiving steering signals including velocities of the movable robot according to the moving directions, an output unit for outputting driving signals including rotational velocities of the motors, and a conversion unit for converting the steering signals to the driving signals.

In an embodiment, the wheels may be arranged at substantially equal angular intervals of 120° with respect to the axis of the body of the movable robot.

In a preferred embodiment, the steering signals are velocities selected from translational velocities and rotational velocities of the movable robot in three directions.

In a preferred embodiment, the steering signals include one or more velocities selected from translational velocities in the forward and backward directions, rotational velocities in the left and right directions and rotational velocities in the upward and downward directions with respect to the moving direction of the movable robot.

In an embodiment, the steering signals may be converted to the driving signals by the following relationship:

$$\underline{\dot{u}} = [G_a^u]\underline{\dot{\theta}}_a$$

where $\underline{\dot{u}}$ is the steering signal defined as $\underline{\dot{u}} = (\omega_x\ \omega_x\ v_{cz})^T$, $\underline{\dot{\theta}}_a$ is the driving signal defined as $\underline{\dot{\theta}}_a = (\dot{\theta}_1\ \dot{\theta}_2\ \dot{\theta}_3)^T$, $\omega_x$ is the rotational velocity in the left and right directions, $\omega_y$ is the rotational velocity in the upward and downward directions, $v_{cz}$ is the translational velocity in the forward and backward direction, $\dot{\theta}$ is the rotational velocity of each motor, and $[G_a^u]$ is given as $$[G_a^u] = \begin{bmatrix} 0 & \dfrac{\sqrt{3}\,r}{3a} & -\dfrac{\sqrt{3}\,r}{3a} \\ -\dfrac{2r}{3a} & \dfrac{r}{3a} & \dfrac{r}{3a} \\ \dfrac{r}{3} & \dfrac{r}{3a} & \dfrac{r}{3a} \end{bmatrix}$$

where a represents the distance from the center of the movable robot to the center of each wheel, and r is the radius of the wheel.

To accomplish the second object of the present invention, there is provided a method for controlling the steering of a movable robot by driving a plurality of motors, each of which is connected to a wheel, the plurality of wheels being spaced apart from each other in the circumferential direction with respect to an axis of a body of the movable robot, wherein the method comprises inputting steering signals including velocities of the movable robot according to the moving directions, converting the steering signals to driving signals including rotational velocities of the motors, and transmitting the driving signals to the motors to drive the movable robot.

In an embodiment, the wheels may be arranged at substantially equal angular intervals of 120° with respect to the axis of the body of the movable robot.

In a preferred embodiment, the steering signals are velocities selected from translational velocities and rotational velocities of the movable robot in three directions that can be inputted by the intuition of an operator.

In a preferred embodiment, the steering signals include one or more velocities selected from translational velocities in the forward and backward directions, rotational velocities in the left and right directions and rotational velocities in the upward and downward directions with respect to the moving direction of the movable robot.

In an embodiment, the steering signals may be converted to the driving signals by the following relationship:

$$\underline{\dot{u}} = [G_a^u] \underline{\dot{\theta}}_a$$

where $\underline{\dot{u}}$ is the steering signal defined as $\underline{\dot{u}} = (\omega_x, \omega_y, v_{cz})^T$, $\underline{\dot{\theta}}_a$ is the driving signal defined as $\underline{\dot{\theta}}_a = (\dot{\theta}_1, \dot{\theta}_2, \dot{\theta}_3)^T$, $\omega_x$ is the rotational velocity in the left and right directions, $\omega_y$ is the rotational velocity in the upward and downward directions, $v_{cz}$ is the translational velocity in the forward and backward directions, $\dot{\theta}$ is the rotational velocity of each motor, and $[G_a^u]$ is given as $$[G_a^u] = \begin{bmatrix} 0 & \frac{\sqrt{3}\,r}{3a} & -\frac{\sqrt{3}\,r}{3a} \\ -\frac{2r}{3a} & \frac{r}{3a} & \frac{r}{3a} \\ \frac{r}{3} & \frac{r}{3a} & \frac{r}{3a} \end{bmatrix}$$

where a represents the distance from the center of the movable robot to the center of each wheel, and r is the radius of the wheel.

To accomplish the third object of the present invention, there is provided a computer-readable recording medium comprising a program recorded therein to implement the steering control method.

To accomplish the fourth object of the present invention, there is provided a movable robot system comprising a movable robot and a steering system for controlling the moving direction of the movable robot wherein the movable robot includes a body, a plurality of wheels spaced apart from each other in the circumferential direction thereof with respect to an axis of the body and motors for driving the respective wheels, and wherein the steering system sends driving signals including rotational velocities of the motors and includes a steering unit for receiving one or more steering signals selected from translational velocities in the forward and backward directions, rotational velocities in the left and right directions and rotational velocities in the upward and downward directions with respect to the moving direction of the movable robot, and a conversion unit for converting the steering signals to the driving signals.

In an embodiment, the wheels may be arranged at substantially equal angular intervals of 120° with respect to the axis of the body of the movable robot.

In a preferred embodiment, the radius of each of the wheels is 10% to 15% of the inner diameter of a pipeline in which the movable robot moves.

In an embodiment, the conversion unit may convert the steering signals to the driving signals by the following relationship:

$$\underline{\dot{u}} = [G_a^u] \underline{\dot{\theta}}_a$$

where $\underline{\dot{u}}$ is the steering signal defined as $\underline{\dot{u}} = (\omega_x, \omega_y, v_{cz})^T$, $\underline{\dot{\theta}}_a$ is the driving signal defined as $\underline{\dot{\theta}}_a = (\dot{\theta}_1, \dot{\theta}_2, \dot{\theta}_3)^T$, $\omega_x$ is the rotational velocity in the left and right directions, $\omega_y$ is the rotational velocity in the upward and downward directions, $v_{cz}$ is the translational velocity in the forward and backward direction, $\dot{\theta}$ is the rotational velocity of each motor, and $[G_a^u]$ is given as $$[G_a^u] = \begin{bmatrix} 0 & \frac{\sqrt{3}\,r}{3a} & -\frac{\sqrt{3}\,r}{3a} \\ -\frac{2r}{3a} & \frac{r}{3a} & \frac{r}{3a} \\ \frac{r}{3} & \frac{r}{3a} & \frac{r}{3a} \end{bmatrix}$$

where a represents the distance from the center of the movable robot to the center of each wheel, and r is the radius of the wheel.

In an embodiment, the steering unit may include an input button for receiving the forward and backward translational velocities and a steering stick for receiving the rotational velocities in the left and right directions and the rotational velocities in the upward and downward directions.

In an embodiment, the input button may be positioned at the upper end of the steering stick.

In an embodiment, the rotational velocities of the movable robot in the upward and downward directions may be inputted by the forward and backward movements of the steering stick, the rotational velocities of the movable robot in the left and right directions may be inputted by the left and right movements of the steering stick, and combined velocities of the rotational velocities of the movable robot in the upward and downward directions and the rotational velocities of the movable robot in the left and right directions may be inputted by the movements between the forward and backward directions and the left and right directions of the steering stick.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention will now be described in more detail with reference to the following preferred embodiments. However, it will be appreciated by one of skill in the art that these embodiments are provided for illustrative purposes only and are not intended to limit the scope of the invention.

A Steering Controller for a Movable Robot

Figure 1:
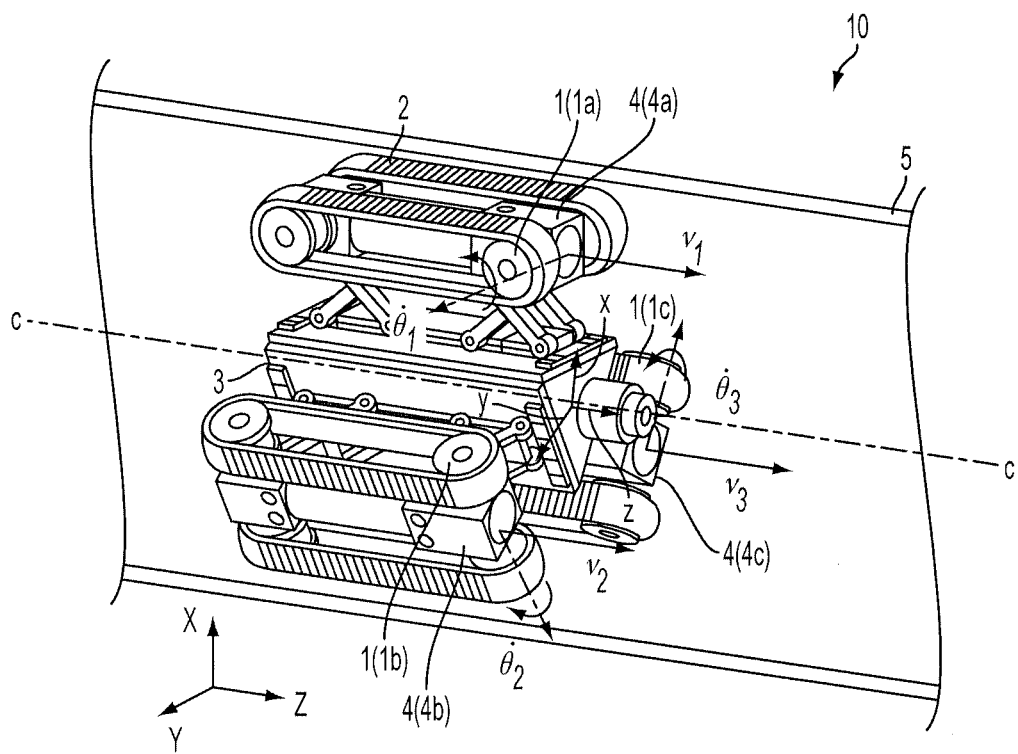
FIG. 1 illustrates the coordinate system and parameters of a pipeline inspection movable robot.

FIG. 1 illustrates a pipeline inspection movable robot 10 and the coordinate system and parameters of the movable robot 10. In the pipeline inspection movable robot 10, powered wheel chains 2 connected to wheels 1 are arranged at substantially equal angular intervals of 120° in the circumferential direction with respect to an axis C of a body 3. Motors 4 of the pipeline inspection movable robot drive the respective wheels 1 to allow the powered wheel chains 2 to move in a pipeline 5 while being in contact with the inner circumferential surface of the pipeline 5. No problem arises when the movable robot 10 moves along a straight pipeline. However, when the movable robot 10 moves in a bent pipeline, the movement of the movable robot 10 does not match the rotations of the motors 4. Therefore, it is difficult for an operator to recognize how to drive the motors 4 to move the movable robot 10 in the bent pipeline.

A purpose of the present invention is to provide a steering controller that converts velocities (e.g., translational velocities and rotational velocities in three directions) inputted according to the moving direction of the movable robot 10 to rotational velocities of the motors 4 to allow an operator to intuitively steer the movable robot 10. For this purpose, it is necessary to find out a relationship between the rotational velocities of the motors 4 and the velocities of the movable robot according to the moving directions.

Since the three motors 4a, 4b and 4c are essential in driving the respective powered wheels 1a, 1b and 1c arranged at equal angular intervals of 120°, three velocity components are needed corresponding to the velocities of the movable robot according to the moving directions. The three velocity components may be composed of various combinations, preferably translational velocities in the forward and backward directions, rotational velocities in the left and right directions and rotational velocities in the upward and downward directions according to the moving direction of the movable robot. Specifically, inputting of translational velocities in the forward and backward directions for the movable robot moving in a straight pipeline and inputting of rotational velocities in the left and right directions or rotational velocities in the upward and downward directions for the movable robot moving in a bent pipeline may be input information that can be recognized most intuitively by an operator.

Hereinafter, the relationship between the rotational velocities of the motors of the movable robot and the velocity components inputted by the operator will be discussed through kinematic analysis.

$\dot{\theta}_1$, $\dot{\theta}_2$ and $\dot{\theta}_3$ of the input velocity vector $\underline{\dot{\theta}}_a = (\dot{\theta}_1 \; \dot{\theta}_3 \; \dot{\theta}_3)^T$ are defined as the rotational velocities of the motors that transmit driving powers to the wheels of the movable robot to rotate the wheels, and $\omega_x$, $\omega_y$ and $v_{cz}$ of the output velocity vector $\underline{\dot{u}} = (\omega_x \; \omega_y \; v_{cz})^T$ are defined as the rotational velocity in the x-axis direction, the rotational velocity in the y-axis direction and the linear velocity in the z-axis direction, respectively, in the coordinate system xyz of the movable robot illustrated in FIG. 1. Here, the rotational velocity in the x-axis direction $\omega_x$ becomes the rotational velocity in the left and right directions, the rotational velocity in the y-axis direction $\omega_y$ becomes the rotational velocity in the upward and downward directions, and the linear velocity $v_{cz}$ in the z-axis direction becomes the translational velocity in the forward and backward directions, with respect to the moving direction (the z axis) of the movable robot.

The input velocity vector can be given by $$v_1 = r\dot{\theta}_1$$

$$v_1 = r\dot{\theta}_2$$

$$v_1 = r\dot{\theta}_3 \quad (1)$$

where $v_1$, $v_2$ and $v_3$ means the linear velocities at the centers of the wheels 1a, 1b and 1c, respectively, and r represents the radius of the wheels.

Case 1: when the Three Motors have the Same Rotational Velocity

Figure 2:
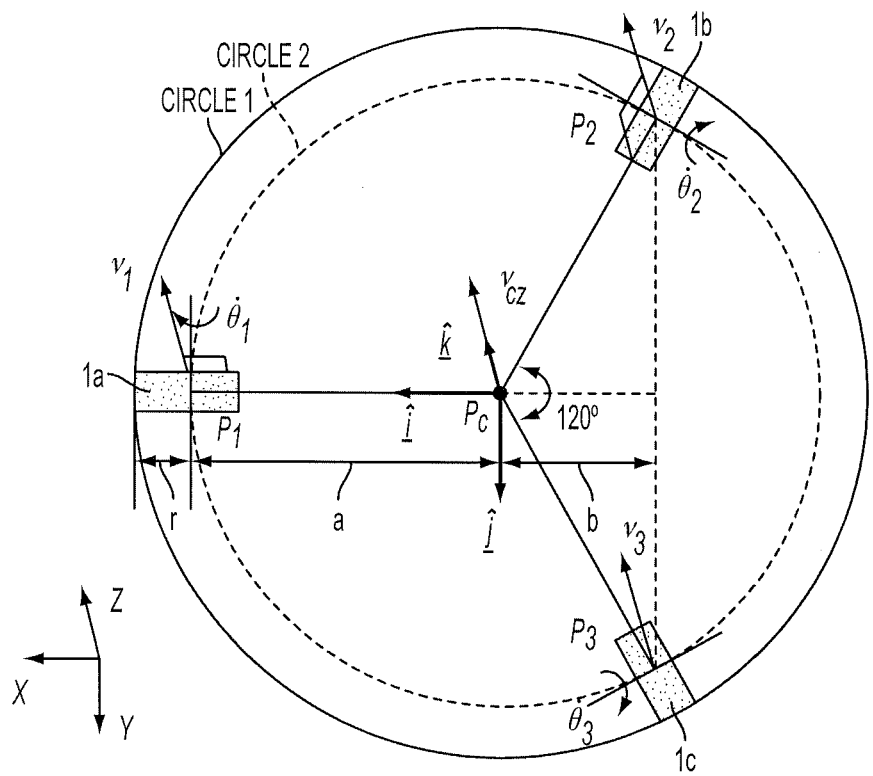
FIG. 2 illustrates velocity profiles of three motors having the same rotational velocity.
Figure 2:
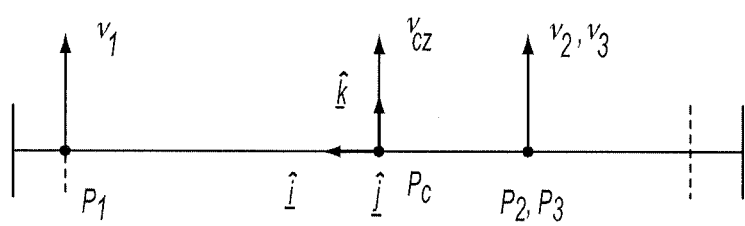

FIG. 2 illustrates velocity profiles of the three motors having the same rotational velocity: (a) and (b) are the velocity profiles of the motors as viewed from the cross section and the side of the pipeline, respectively.

Here, $P_e$ denotes the center of the movable robot, $P_1$, $P_2$ and $P_3$ denote the centers of the wheels 1a, 1b and 1c, respectively, $v_{cz}$ denotes the linear velocity at the center of the movable robot, v1, v2 and v3 denote the linear velocities at the centers of the respective wheels, a denotes the distance from the center $P_e$ of the movable robot to the center of each wheel, r denotes the radius of the wheels, and b denotes the distance from the center of the movable robot to a straight line connecting the centers of two of the wheels. The same definitions of the parameters are applied to velocity profiles of FIGS. 3 through 5 as well.

When the three motors have the same rotational velocity, the movable robot translates in the z-axis direction of the coordinate system without generating any rotational velocities.

$$v_{cz} = v_1 (= v_2 = v_3) \quad (2)$$

Case 2: when a Rotational Velocity is Generated in One of the Motors

Figure 3:
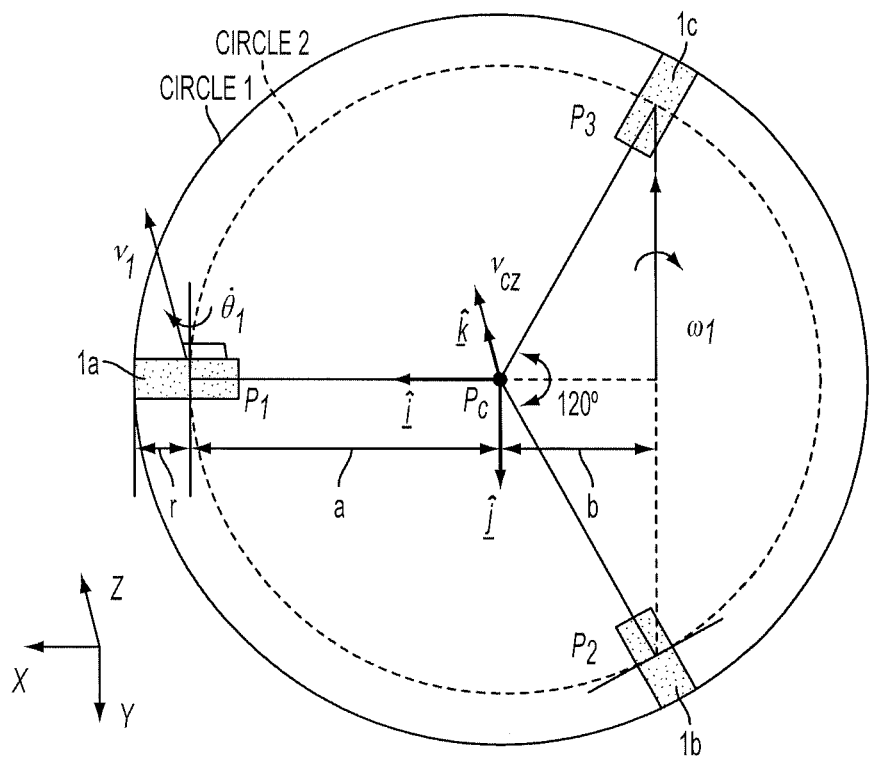
FIG. 3 illustrates velocity profile of three motors when a rotational velocity is generated in one of the motors.
Figure 3:
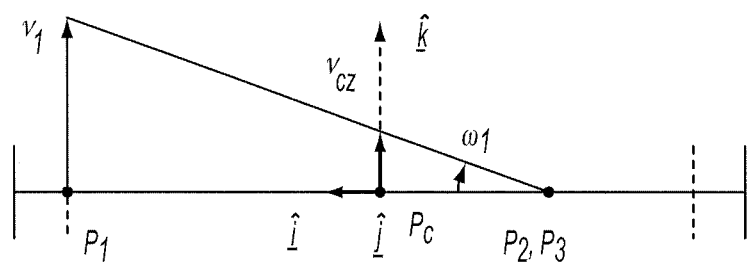

FIG. 3 illustrates velocity profiles of the three motors when a rotational velocity is generated in the first motor to drive the wheel 1a: (a) and (b) are the velocity profiles as viewed from the cross section and the side of the pipeline, respectively.

In this case, the rotational velocity $\omega_1$ about line $\overline{P_2 P_3}$ is obtained (a) and the linear velocity $v_{cz}$ at the center $P_e$ of the movable robot is obtained (b). The respective velocities can be described as $$\omega_x = 0, \quad \omega_y = -\frac{r}{1.5a}\dot{\theta}_1, \quad v_{cz} = \frac{b}{a+b}v_1 = \frac{0.5a}{1.5a}v_1 = \frac{r}{3}\dot{\theta}_1 \quad (3)$$

Case 3: when Rotational Velocities are Generated in Two of the Motors

Figure 4:
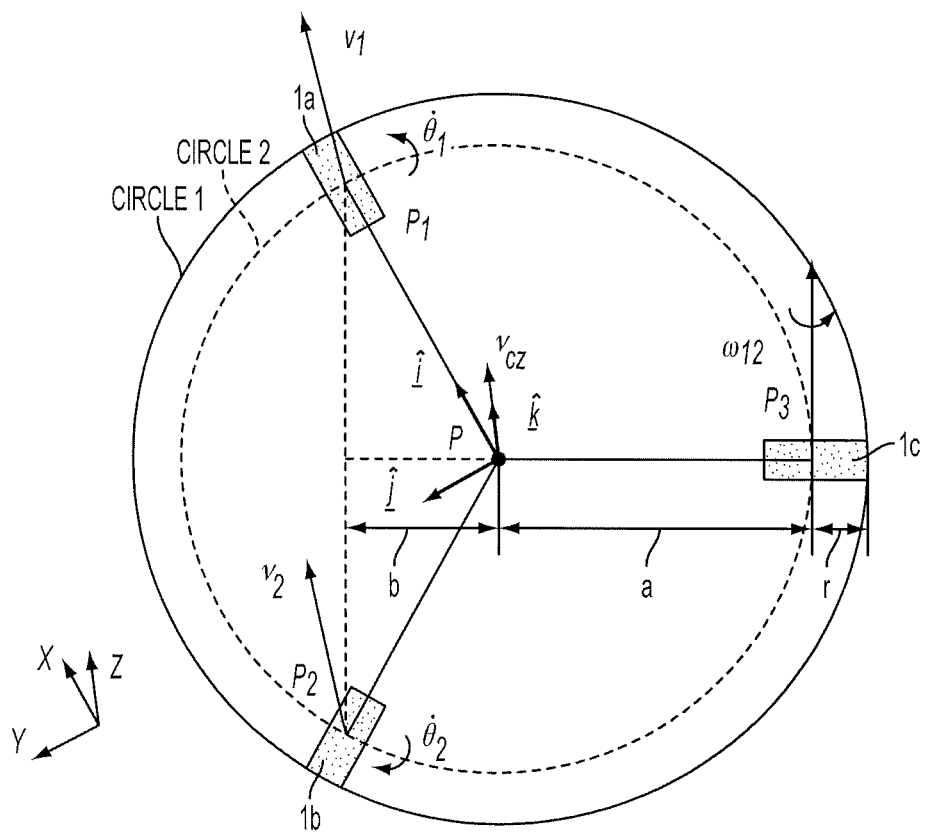
FIG. 4 illustrates velocity profiles of three motors when rotational velocities are generated in two of the motors.
Figure 4:
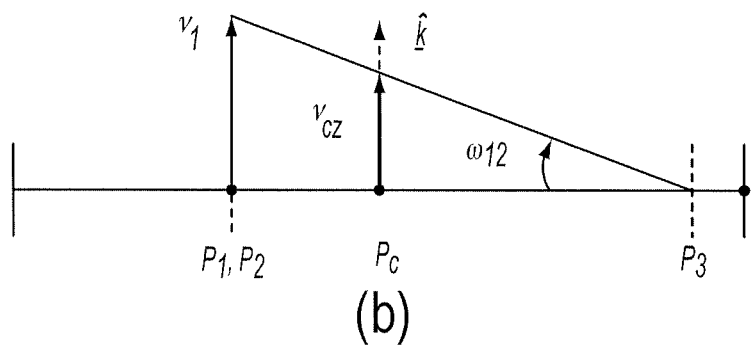

FIG. 4 illustrates velocity profiles of the three motors when rotational velocities are generated in the first and second motors to drive the wheels 1a and 1b, respectively: (a) and (b) are the velocity profiles as viewed from the cross section and the side of the pipeline, respectively.

In this case, the rotational velocity $\omega_{12}$ is obtained (4a) and the linear velocity $v_{cz}$ at the center $P_e$ of the movable robot is obtained (4b). The respective velocities can be described as $$\omega_x = \frac{\sqrt{3}r}{3a}\dot{\theta}_2, \quad \omega_y = -\frac{r}{3a}\dot{\theta}_2, \quad (4)$$

$$v_{cz} = \frac{a}{a+b}v_1 = \frac{a}{1.5a}v_1 = \frac{2r}{3}\dot{\theta}_1 \text{ or } \frac{2r}{3}\dot{\theta}_2$$

Case 4: when Different Rotational Velocities are Generated in the Three Motors

Figure 5:
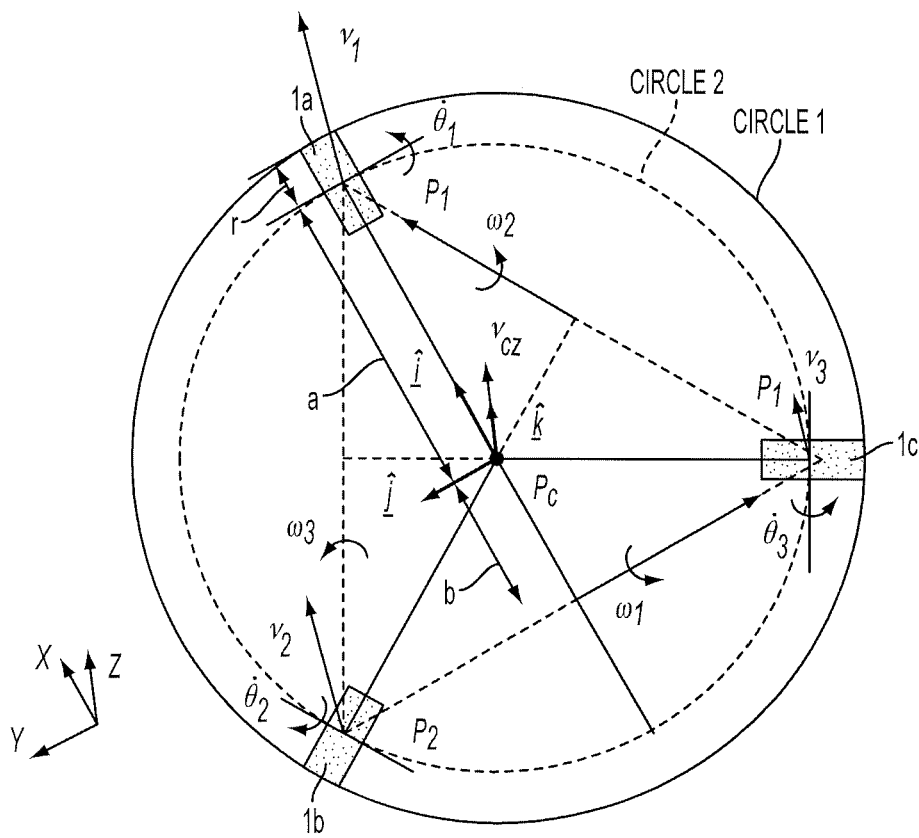
FIG. 5 illustrates velocity profiles of three motors when different rotational velocities are generated in all the motors.
Figure 5:
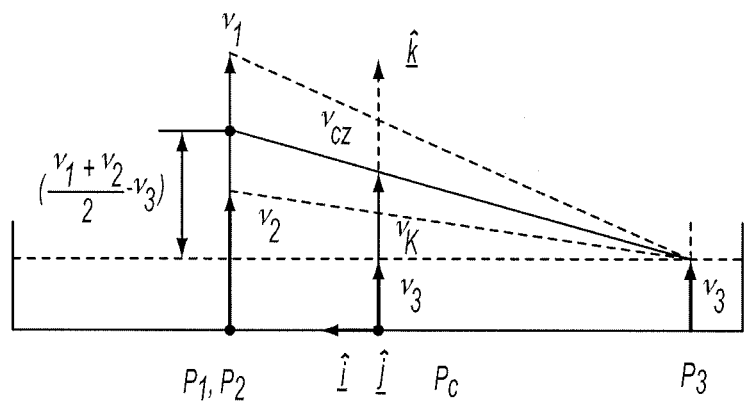

FIG. 5 illustrates velocity profiles of the three motors when different rotational velocities are generated in all the motors: (a) and (b) are the velocity profiles as viewed from the cross section and the side of the pipeline, respectively.

In this case, the total rotational velocity of the robot is created by summation of the three rotational velocities (5a) and the linear velocity $v_{cz}$ at the center of the movable robot is obtained (5b). The respective velocities can be described as $$\omega_x = \frac{\sqrt{3}r}{3a}\dot{\theta}_2 - \frac{\sqrt{3}r}{3a}\dot{\theta}_3, \quad \omega_y = -\frac{2r}{3a}\dot{\theta}_1 + \frac{r}{3a}\dot{\theta}_2 + \frac{r}{3a}\dot{\theta}_3, \quad (5)$$

$$v_{cz} = \frac{1}{3}(v_1 + v_2 + v_3) = \frac{r}{3}(\dot{\theta}_1 + \dot{\theta}_2 + \dot{\theta}_3)$$

The relationship between the input velocity vector and the output velocity vector obtained through the above four cases is constructed as $$\underline{\dot{u}} = [G_a^u]\underline{\dot{\theta}}_a \quad (6)$$

Here, the Jacobian $[G_a^u]$ is given as $$[G_a^u] = \begin{bmatrix} 0 & \frac{\sqrt{3}r}{3a} & -\frac{\sqrt{3}r}{3a} \\ -\frac{2r}{3a} & \frac{r}{3a} & \frac{r}{3a} \\ \frac{r}{3} & \frac{r}{3a} & \frac{r}{3a} \end{bmatrix} \quad (7)$$

By utilizing Equations 6 and 7, the velocity of the movable robot can be controlled at the given level. Inverse transformation of Equation 7 gives $$\underline{\dot{\theta}}_a = [G_u^a]\underline{\dot{u}} \quad (8)$$

Equation 8 has the meaning that when an operator inputs a rotational velocity in a desired rotational direction of the movable robot, the input value can be converted to rotational velocities of the respective motors. That is to say, when the operator inputs a velocity value in any desired direction from 0° to 360° and a linear velocity value at the center of the movable robot, the input values can be converted to rotational values of the respective motors, implying that the operator can control the movable robot by his/her intuition.

Figure 6:
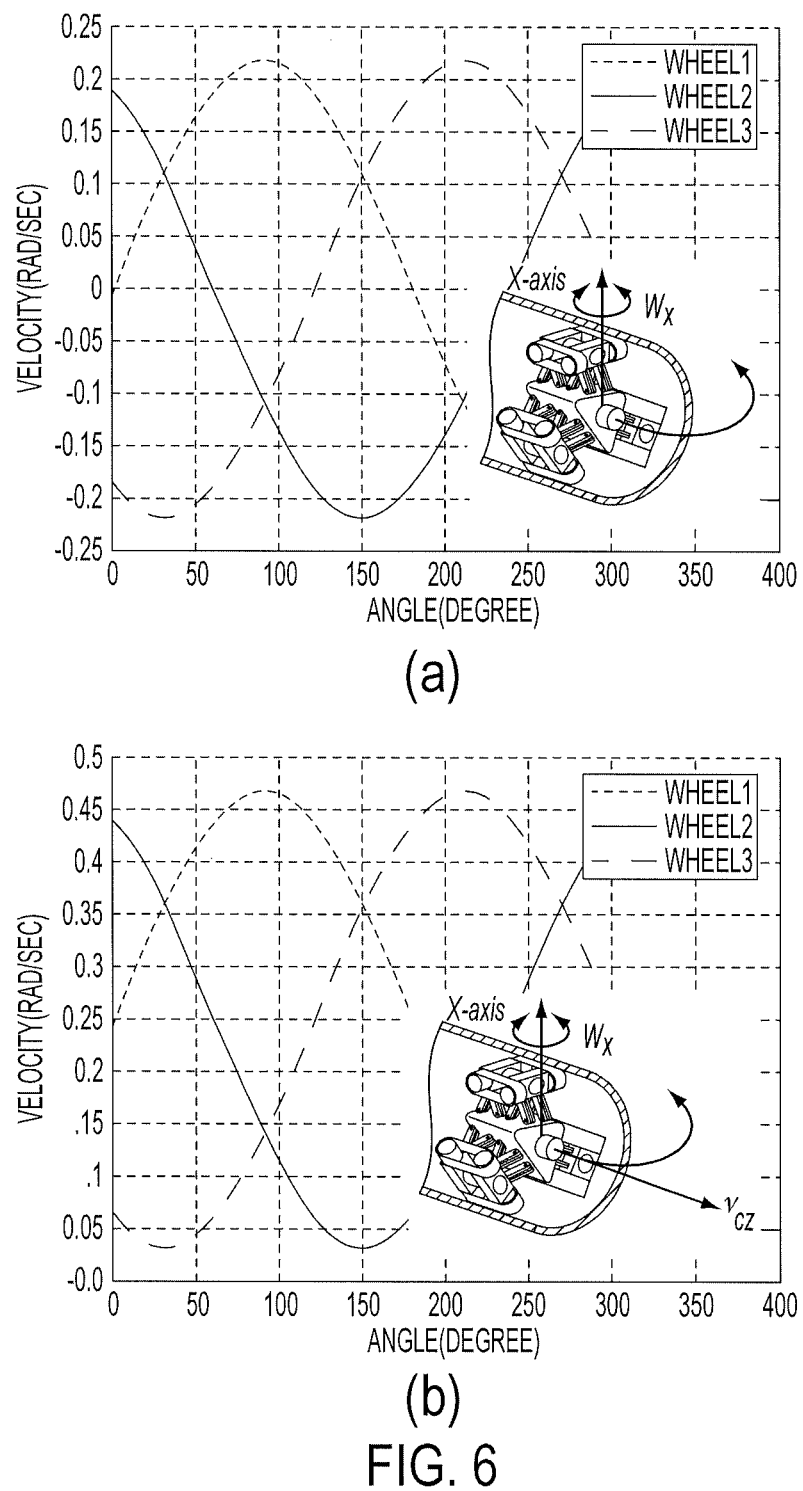
FIG. 6 graphically shows changes in the rotational velocity of motors.

FIG. 6 graphically shows rotational velocity profiles of the motors to verify the relationship between the input velocity vector defined by Equation 6 and the output velocity vector defined by Equation 7: (a) is a graph showing changes in the rotational velocity of the motors when 0 cm/sec and 15 degree/sec are inputted as the linear velocity $v_{cz}$ (i.e. the translational velocity in the forward and backward directions) and the rotational velocity $\omega_x$ of the movable robot in the left and right directions, respectively; and (b) is a graph showing changes in the rotational velocity of the motors when 3 cm/sec and 15 degree/sec are inputted as the linear velocity $v_{cz}$ and the rotational velocity $\omega_x$ of the movable robot in the left and right directions, respectively.

Figure 7:
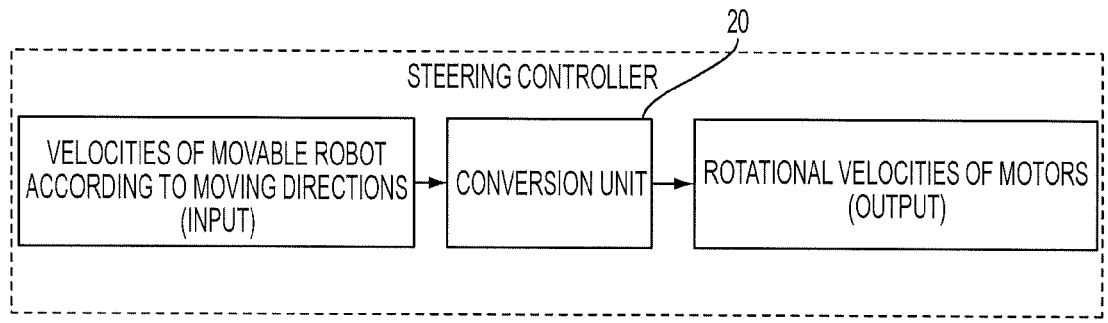
FIG. 7 is a block diagram of a steering controller according to an embodiment of the present invention.

FIG. 7 is a block diagram showing the construction of a steering controller according to an embodiment of the present invention based on the kinematic analysis of the robot.

The steering controller comprises an input unit for receiving velocities of the movable robot according to the moving directions, an output unit for outputting rotational velocities of the motors, and a conversion unit 20. The conversion unit 20 converts steering signals (the velocities of the movable robot according to the moving directions) according to the intuition of an operator to driving signals (the rotational velocities of the motors).

When an operator intends to steer and move the movable robot with no difficulty in a bent pipeline, he/she can input a velocity according to a desired moving direction. This input enables the operator to intuitionally steer the movable robot, thus eliminating the need to directly input the rotational velocities of the motors.

A Steering Control Method of the Movable Robot

A steering control method of the movable robot according to an embodiment of the present invention by using the steering controller will be explained below.

Figure 8:
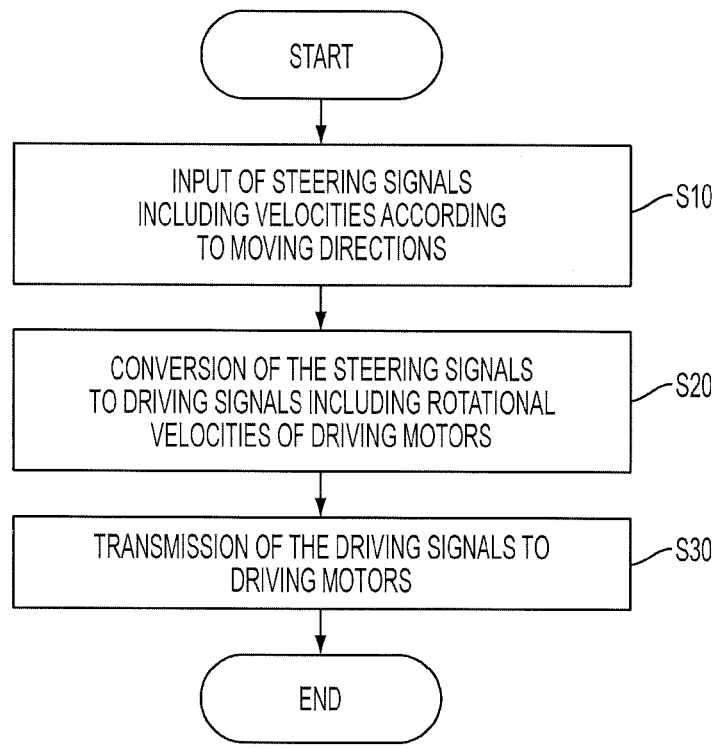
FIG. 8 is a flow chart illustrating a steering control method according to an embodiment of the present invention.

FIG. 8 illustrates the steering control method. As illustrated in FIG. 8, the steering control method comprises inputting steering signals including velocities of the movable robot according to the moving directions (S10), converting the steering signals to driving signals including rotational velocities of the motors (S20), and transmitting the driving signals to the motors to drive the movable robot (S30).

Specifically, in step S10, input velocity components of the movable robot can be inputted by the intuition of an operator. That is, velocities selected from translational velocities in three directions and rotational velocities in three directions according to the moving direction of the movable robot can be inputted. Preferably, one or more velocities selected from translational velocities in the forward and backward directions, rotational velocities in the left and right directions and rotational velocities in the upward and downward directions with respect to the moving direction of the movable robot can be inputted.

In step S20, the steering signals are converted to rotational velocities of the motors. In this step, the velocities of the movable robot inputted by the intuition of the operator according to the moving directions are converted to rotational velocities of the motors. This conversion can be given by Equation 8.

In step S30, driving signals converted from the rotational velocities of the motors are transmitted to the motors to drive the movable robot.

According to the steering control method of the present invention, an operator inputs steering signals recognized by his/her intuition from the shape and/or structure of a pipeline and the steering signals are converted to rotational velocities of the motors to drive the movable robot. In contrast, according to a conventional steering control method, an operator directly controls the rotational velocities of motors in an on-off fashion. Therefore, the steering control method of the present invention enables control of the moving direction of the movable robot in a simpler manner.

On the other hand, the steering control method of the present invention can be recorded as a program that can be implemented on a computer and can be realized on a general purpose digital computer in which a computer-readable recording medium is used to operate the program. In addition, the structure of the data used in the above embodiment of the present invention can be recorded by various means in a computer-readable recording medium.

Examples of the computer-readable recording medium include magnetic storage media (e.g., ROMs, floppy disks and hard disks), optical reading media (e.g., CD-ROMs and DVDs) and carrier waves (e.g., transmission through the Internet).

Calculation of Optimal Wheel Size

Optimal kinematic parameterization of the movable robot is conducted to calculate the optimal size of the wheels through the Jacobian, which is found by the kinematic analysis of the movable robot.

The inner diameter d of the pipeline is set as 100 mm, which creates the following constraint equation relating a and r given by $$2(a+r)=d \quad (9)$$

This equation is seen from FIG. 2.

Denoting $\sigma_{max}$ and $\sigma_{min}$ as the maximum and minimum singular values of the Jacobian, respectively, the isotropic index is expressed as $$\sigma_I = \frac{\sigma_{min}}{\sigma_{max}} \quad (10)$$

The isotropic index is indicative of the motion capability of the movable robot in every direction. That is, large $\sigma_i$ implies improved motion capability of the movable robot.

Meanwhile, maximum force transmission ratio is defined as the operational load created by the unit torque norm. It is defined as $$\sigma_f = \frac{1}{\sigma_{min}} \quad (11)$$

The greater $\sigma_f$, the larger operational load created.

Figure 9:
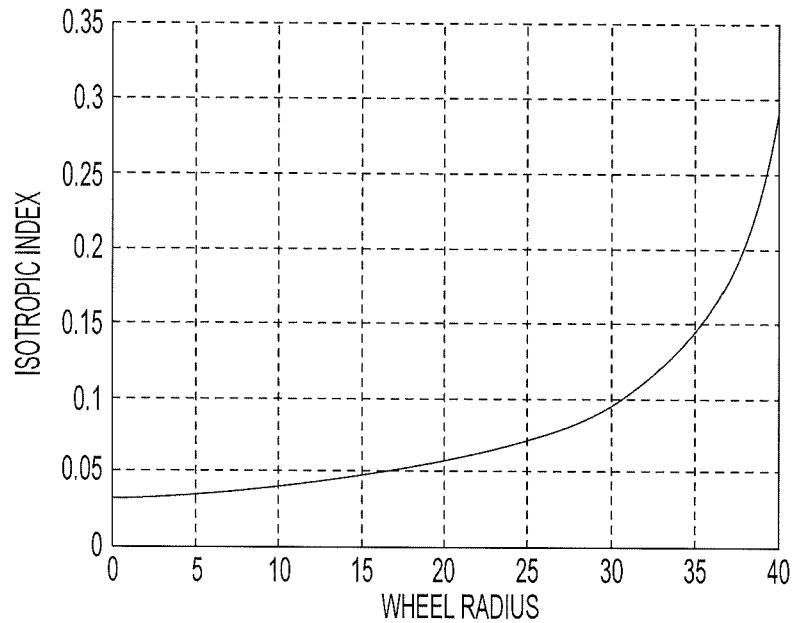
FIG. 9 shows plots for the isotropic index and maximum force transmission ratio of a movable robot with respect to wheel radius.
Figure 9:
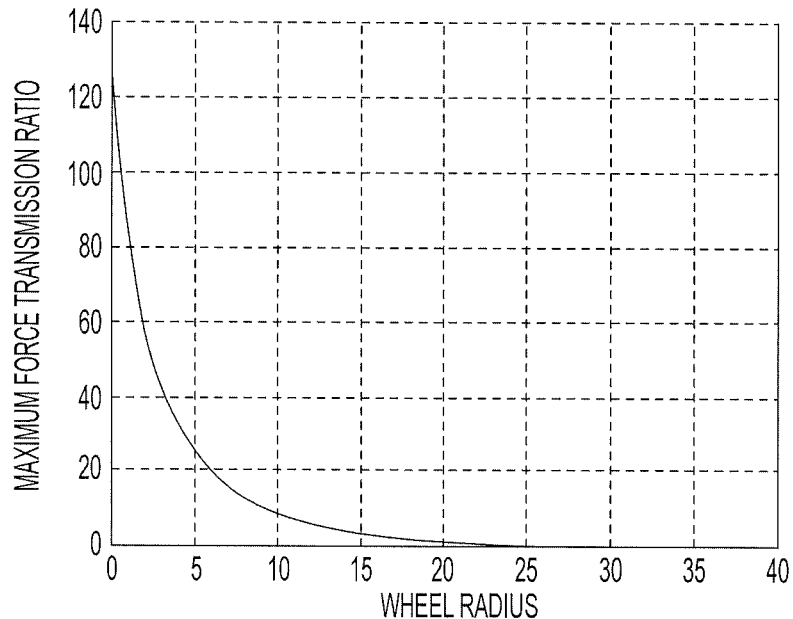

FIG. 9 shows plots for $\sigma_1$ and $\sigma_f$ with respect to the wheel radius.

Figure 10:
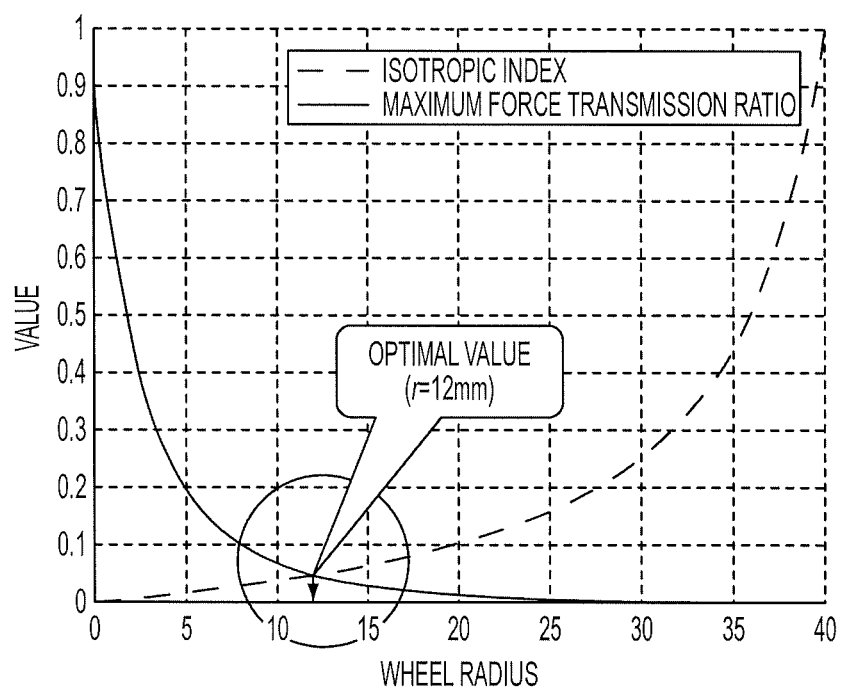
FIG. 10 is a plot showing the optimal value of wheel radius.

Normalizing the two indices and combining them by using a max-min theorem used in the fuzzy set theory, an optimal value of the radius can be found from the plot of FIG. 10.

It is found that when the pipeline has an inner radius of 100 mm, each wheel preferably has a size of about 10 mm to about 15 mm and more preferably 12 mm. In other words, it is preferable to set the size of the wheels to 10-15% relative to the inner radius of the pipeline.

The wheel having the above optimal radius range is most efficient in terms of motion capability and force transmission.

The force transmission of the wheel smaller than the size range defined above is poor. Meanwhile, the motion capability of the wheel larger than the size range defined above deteriorates.

A Steering System Using the Steering Controller

The steering controller is actually applied to a steering system 30 for the movable robot according to an embodiment of the present invention.

Figure 11:
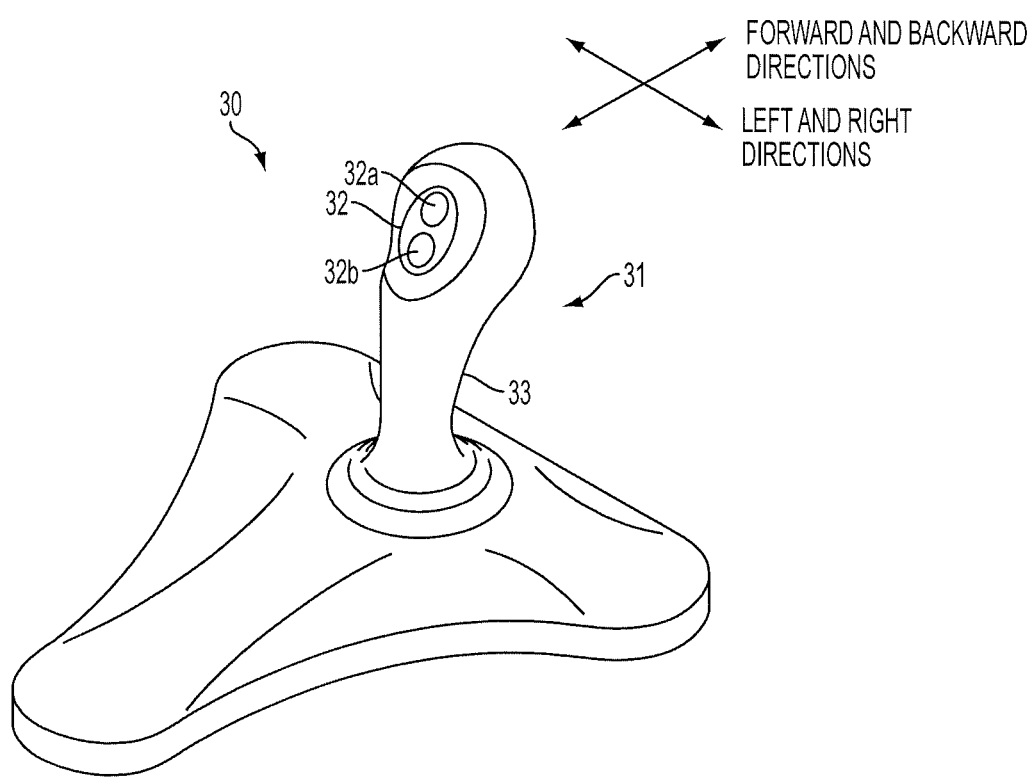
FIG. 11 is a schematic perspective view of a steering unit of a steering controller according to an embodiment of the present invention.

FIG. 11 illustrates a schematic perspective view of the steering system 30.

The steering system 30 comprises a steering unit 31 for receiving steering signals including translational velocities in the forward and backward directions, rotational velocities in the left and right directions and rotational velocities in the upward and downward directions with respect to the moving direction of the movable robot, and a conversion unit (not shown) for converting the steering signals to driving signals.

The driving signals outputted via the conversion unit are transmitted to the motors of the movable robot. This signal transmission can be accomplished by a known method (e.g., wireless or wire connection), which is apparent to a person skilled in the art and thus a detailed description thereof is omitted.

The steering unit 31 includes an input button 32 for receiving the translational velocities in the forward and backward directions and a steering stick 33 for receiving the rotational velocities in the left and right directions and the rotational velocities in the upward and downward directions. For convenience of steering, the input button 32 can be positioned at the upper end of the steering stick 33, as illustrated in FIG. 11.

The input button 32 consists of two sub-buttons. The input button 32 can be designed such that the movable robot moves forward when the first button 32a is pressed and moves backward when the second button 32b is pressed. Further, the velocity of the movable robot may be increased or decreased depending on the pressurization pressure of the button.

Figure 12:
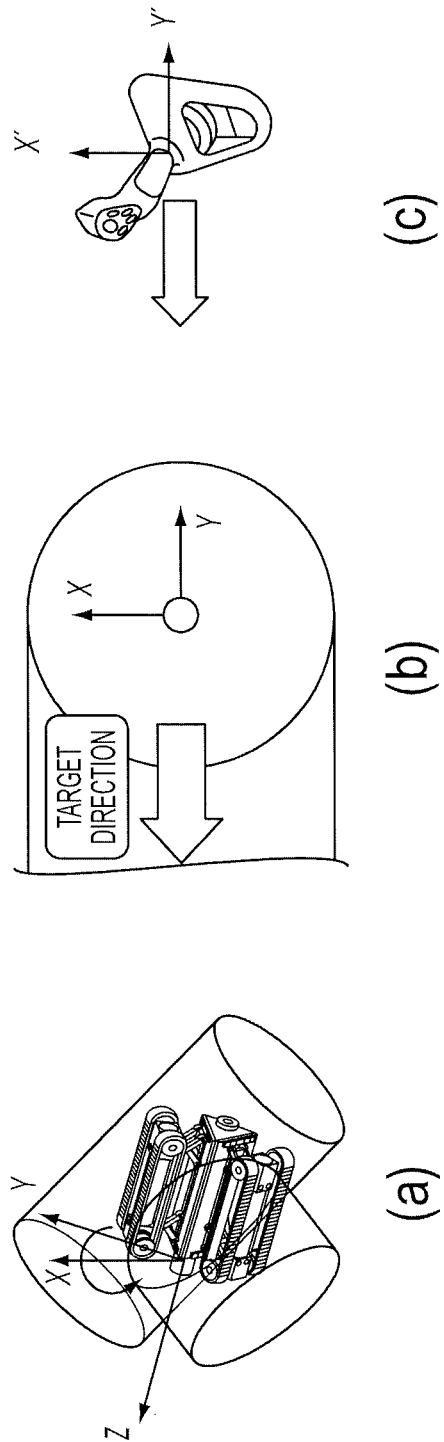
FIG. 12 illustrates conceptual diagrams of a steering system according to an embodiment of the present invention.

FIG. 12 illustrates conceptual diagrams of the steering system: a motion coordinate system of the movable robot (a); a motion coordinate system of a camera view attached to the movable robot (b); and a coordinate system of the steering system (c).

That is, an operator determines the moving direction of the movable robot via the camera attached to the front side of the movable robot. Based on this determination, when the operator intuitionally steers the steering system, the rotational velocities of the motors connected to the respective wheels are varied so as to move the movable robot in the target direction.

For example, when the operator intends to move the movable robot in the left direction while observing the internal state of a pipeline through the camera attached to the movable robot ((b) in FIG. 12), he/she has only to intuitionally move the steering stick 33 of the steering system in the left direction ((c) in FIG. 12). As a result, the signals inputted through the steering system are converted to rotational velocities of the respective motors to move the movable robot in the left direction.

Accordingly, the rotational velocities of the movable robot in the upward and downward directions can be inputted by the forward and backward movements of the steering stick 33, respectively, and the rotational velocities of the movable robot in the left and right directions can be inputted by the left and right movements of the steering stick 33, respectively. Combined velocities of the rotational velocities of the movable robot in the upward and downward directions and the rotational velocities of the movable robot in the left and right directions can be inputted by the movements between the forward and backward directions and the left and right directions of the steering stick.

Figure 13:
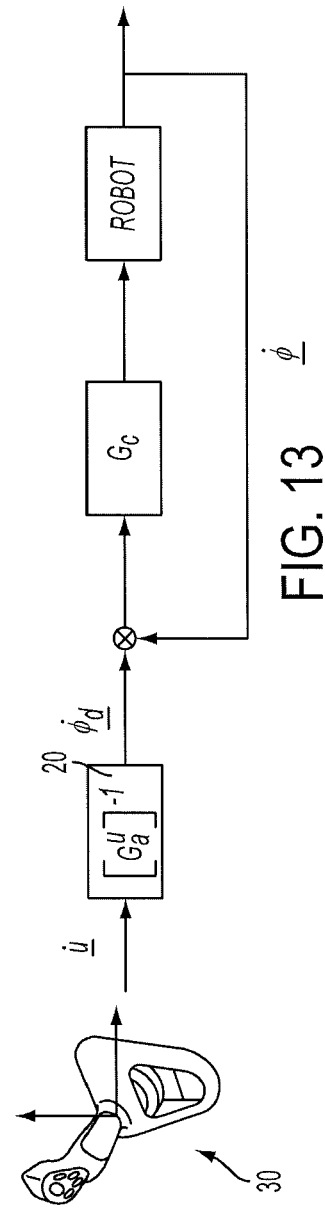
FIG. 13 is a block diagram illustrating a steering process of a movable robot according to an embodiment of the present invention.

FIG. 13 is a block diagram illustrating a steering process of the movable robot.

The steering signal $\underline{\dot{u}}$ inputted through the steering unit 31 is outputted as the driving signal $\underline{\dot{\phi}}_d$ of the motor via the conversion unit 20. The driving signal $\underline{\dot{\phi}}_d$ is transmitted to the movable robot through a driving controller $G_c$ along with the feedback controlled driving signal $\underline{\dot{\phi}}$. In this way, the movable robot can be precisely and intuitionally steered.

As is apparent from the above description, the steering controller of the present invention can convert signals inputted by an operator's intuition to driving signals to rotate the motors, making the movable robot convenient to use. In addition, an operator can easily steer the movable robot by using the steering system including the steering controller while observing the moving direction of the movable robot through a camera attached to the movable robot. Therefore, the steering controller of the present invention can present many advantages in terms of practicality and effectiveness.

Those skilled in the art will readily appreciate that simple modifications and variations of the present invention can be made and such modifications and variations are encompassed within the scope and spirit of the present invention.

What is claimed is:

1. A steering controller for steering a movable robot by driving a plurality of motors, each of which is connected to a wheel, the plurality of wheels being spaced apart from each other in the circumferential direction with respect to an axis of a body of the movable robot,
   wherein the steering controller comprises an input unit for receiving steering signals including velocities of the movable robot according to the moving directions, an output unit for outputting driving signals including rotational velocities of the motors, and a conversion unit for converting the steering signals to the driving signals,
   wherein the steering signals include one or more velocities selected from translational velocities in the forward and backward directions, rotational velocities in the left and right directions and rotational velocities in the upward and downward directions with respect to the moving direction of the movable robot, which are inputted by the intuition of an operator, and
   wherein the steering signals are converted to the driving signals by the following relationship:

$$\underline{\dot{u}} = [G_a^u] \underline{\dot{\theta}}_a$$

where $\underline{\dot{u}}$ is the steering signal defined as $\underline{\dot{u}} = (\omega_x\ \omega_y\ v_{cz})^T$, $\underline{\dot{\theta}}_a$ is the driving signal defined as $\underline{\dot{\theta}}_a = (\dot{\theta}_1\ \dot{\theta}_2\ \dot{\theta}_3)^T$, $\omega_x$ is the rotational velocity in the left and right directions, $\omega_y$ is the rotational velocity in the upward and downward directions, $v_{cz}$ is the translational velocity in the forward and backward direction, $\dot{\theta}$ is the rotational velocity of each motor, and $[G_a^u]$ is given as $$[G_a^u] = \begin{bmatrix} 0 & \frac{\sqrt{3}r}{3a} & -\frac{\sqrt{3}r}{3a} \\ -\frac{2r}{3a} & \frac{r}{3a} & \frac{r}{3a} \\ \frac{r}{3} & \frac{r}{3a} & \frac{r}{3a} \end{bmatrix}$$

where a represents the distance from the center of the movable robot to the center of each wheel, and r is the radius of the wheel.

2. The steering controller of claim 1, wherein the wheels are arranged at substantially equal angular intervals of 120° with respect to the axis of the body of the movable robot.

3. A method for controlling the steering of a movable robot by driving a plurality of motors, each of which is connected to a wheel, the plurality of wheels being spaced apart from each other in the circumferential direction with respect to an axis of a body of the movable robot,
   wherein the method comprises inputting steering signals including velocities of the movable robot according to the moving directions, converting the steering signals to driving signals including rotational velocities of the motors, and transmitting the driving signals to the motors to drive the movable robot,
   wherein the step of inputting steering signals includes inputting one or more velocities selected from translational velocities in the forward and backward directions, rotational velocities in the left and right directions and rotational velocities in the upward and downward directions with respect to the moving direction of the movable robot, which are inputted by the intuition of an operator, and
   wherein the steering signals are converted to the driving signals by the following relationship:

$$\underline{\dot{u}} = [G_a^u] \underline{\dot{\theta}}_a$$

where $\underline{\dot{u}}$ is the steering signal defined as $\underline{\dot{u}} = (\omega_x\ \omega_y\ v_{cz})^T$, $\underline{\dot{\theta}}_a$ is the driving signal defined as $\underline{\dot{\theta}}_a = (\dot{\theta}_1\ \dot{\theta}_2\ \dot{\theta}_3)^T$, $\omega_x$ is the rotational velocity in the left and right directions, $\omega_y$ is the rotational velocity in the upward and downward directions, $v_{cz}$ is the translational velocity in the forward and backward directions, $\dot{\theta}$ is the rotational velocity of each motor, and $[G_a^u]$ is given as $$[G_a^u] = \begin{bmatrix} 0 & \frac{\sqrt{3}r}{3a} & -\frac{\sqrt{3}r}{3a} \\ -\frac{2r}{3a} & \frac{r}{3a} & \frac{r}{3a} \\ \frac{r}{3} & \frac{r}{3a} & \frac{r}{3a} \end{bmatrix}$$

where a represents the distance from the center of the movable robot to the center of each wheel, and r is the radius of the wheel.

4. The method of claim 3, wherein the wheels are arranged at substantially equal angular intervals of 120° with respect to the axis of the body of the movable robot.

5. A non-transitory computer-readable recording medium comprising a program recorded therein to implement a method for controlling the steering of a movable robot by driving a plurality of motors, each of which is connected to a wheel, the plurality of wheels being spaced apart from each other in the circumferential direction with respect to an axis of a body of the movable robot, wherein the method comprises inputting steering signals including velocities of the movable robot according to the moving directions, converting the steering signals to driving signals including rotational velocities of the motors, and transmitting the driving signals to the motors to drive the movable robot, wherein the step of inputting steering signals includes inputting one or more velocities selected from translational velocities in the forward and backward directions, rotational velocities in the left and right directions and rotational velocities in the upward and downward directions with respect to the moving direction of the movable robot, which are inputted by the intuition of an operator, and wherein the steering signals are converted to the driving signals by the following relationship:

$$\underline{\dot{u}} = [G_a^u] \underline{\dot{\theta}}_a$$

where $\underline{\dot{u}}$ is the steering signal defined as $\underline{\dot{u}} = (\omega_x, \omega_y, v_{dz})^T$, $\underline{\dot{\theta}}_a$ is the driving signal defined as $\underline{\dot{\theta}}_a = (\dot{\theta}_1, \dot{\theta}_2, \dot{\theta}_3)^T$, $\omega_x$ is the rotational velocity in the left and right directions, $w_y$ is the rotational velocity in the upward and downward directions, $v_{cz}$ is the translational velocity in the forward and backward directions, $\dot{\theta}$ is the rotational velocity of each motor, and $[G_a^u]$ is given as $$[G_a^u] = \begin{bmatrix} 0 & \frac{\sqrt{3}r}{3a} & -\frac{\sqrt{3}r}{3a} \\ -\frac{2r}{3a} & \frac{r}{3a} & \frac{r}{3a} \\ \frac{r}{3} & \frac{r}{3a} & \frac{r}{3a} \end{bmatrix}$$

where a represents the distance from the center of the movable robot to the center of each wheel, and r is the radius of the wheel.

6. A movable robot system comprising a movable robot and a steering system for controlling the moving direction of the movable robot wherein the movable robot includes a body, a plurality of wheels spaced apart from each other in the circumferential direction thereof with respect to an axis of the body and motors for driving the respective wheels, wherein the steering system sends driving signals including rotational velocities of the motors and includes a steering unit for receiving one or more steering signals selected from translational velocities in the forward and backward directions, rotational velocities in the left and right directions and rotational velocities in the upward and downward directions with respect to the moving direction of the movable robot that are inputted by the intuition of an operator, and wherein the conversion unit converts the steering signals to the driving signals by the following relationship:

$$\underline{u\dot{u}} = [G_a^u] \underline{\dot{\theta}}_a$$

where $\underline{\dot{u}}$ is the steering signal defined as $\underline{\dot{u}} = (\omega_x, \omega_y, v_{cz})^T$, $\underline{\dot{\theta}}_a$ is the driving signal defined as $\underline{\dot{\theta}}_a = (\dot{\theta}_1, \dot{\theta}_2, \dot{\theta}_3)^T$, $\omega_x$ is the rotational velocity in the left and right directions, $\omega_y$ is the rotational velocity in the upward and downward directions, $v_{cz}$ is the translational velocity in the forward and backward direction, $\dot{\theta}$ is the rotational velocity of each motor, and $[G_a^u]$ is given as $$[G_a^u] = \begin{bmatrix} 0 & \frac{\sqrt{3}r}{3a} & -\frac{\sqrt{3}r}{3a} \\ -\frac{2r}{3a} & \frac{r}{3a} & \frac{r}{3a} \\ \frac{r}{3} & \frac{r}{3a} & \frac{r}{3a} \end{bmatrix}$$

where a represents the distance from the center of the movable robot to the center of each wheel, and r is the radius of the wheel, and a conversion unit for converting the steering signals to the driving signals.

7. The movable robot system of claim 6, wherein the wheels are arranged at substantially equal angular intervals of 120° with respect to the axis of the body of the movable robot.

8. The movable robot system of claim 7, wherein the radius of each of the wheels is 10% to 15% of the inner diameter of a pipeline in which the movable robot moves.

9. The movable robot system of claim 6, wherein the steering unit includes an input button for providing the forward and backward translational velocities and a steering stick for providing the rotational velocities in the left and right directions and the rotational velocities in the upward and downward directions.

10. The movable robot system of claim 9, wherein the input button is positioned at the upper end of the steering stick.

11. The movable robot system of claim 9, wherein the rotational velocities of the movable robot in the upward and downward directions are inputted by the forward and backward movements of the steering stick, the rotational velocities of the movable robot in the left and right directions are inputted by the left and right movements of the steering stick, and combined velocities of the rotational velocities of the movable robot in the upward and downward directions and the rotational velocities of the movable robot in the left and right directions are inputted by the movements between the forward and backward directions and the left and right directions of the steering stick.

* * * * *